Patented July 29, 1924.

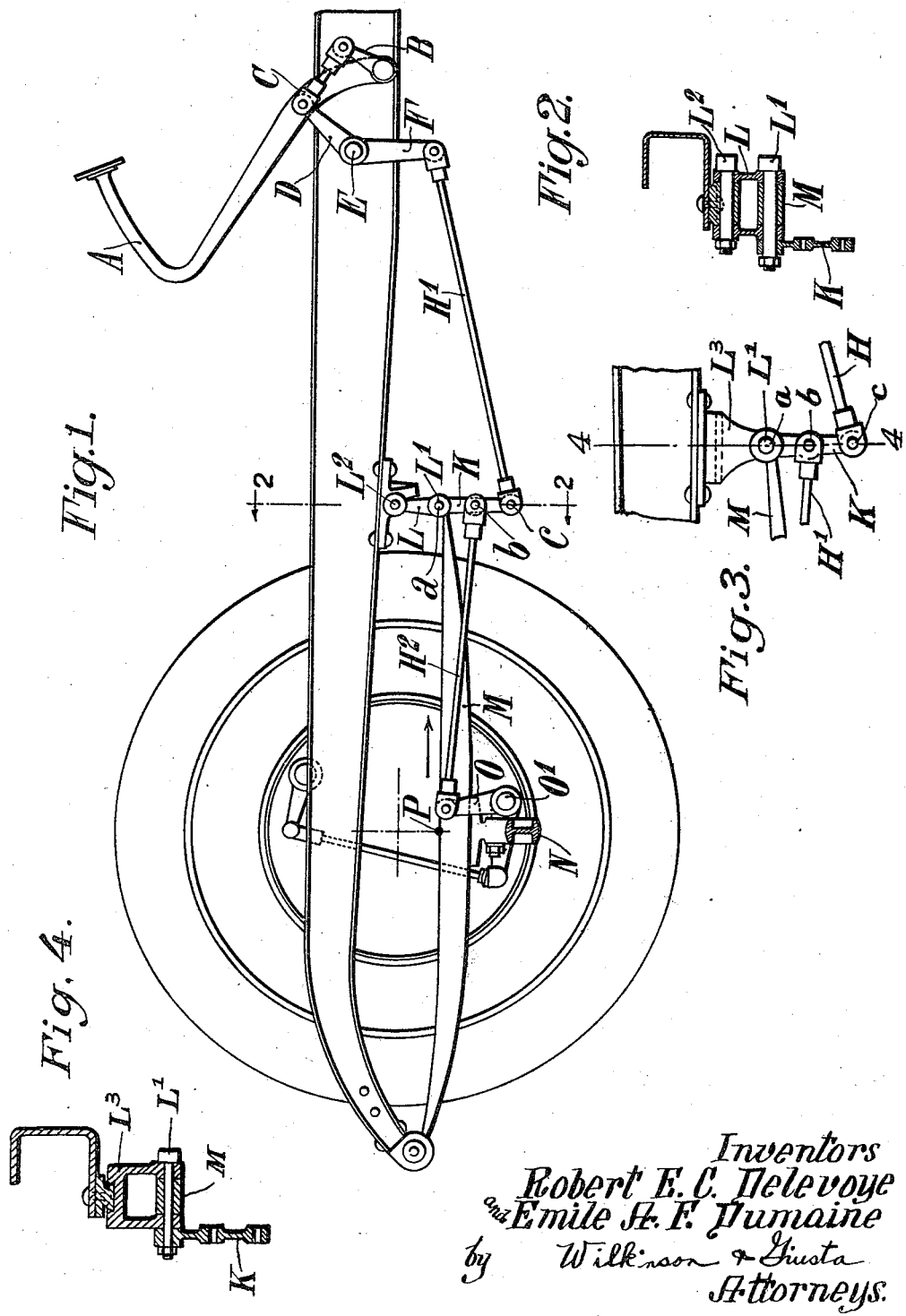

1,503,350

UNITED STATES PATENT OFFICE.

ROBERT EMILE CHARLES DELEVOYE, OF PARIS, AND EMILE ALBERT FRANÇOIS DUMAINE, OF NEUILLY-SUR-SEINE, FRANCE, ASSIGNORS TO SOCIÉTÉ ANONYME DES ANCIENS ETABLISSEMENTS HOTCHKISS & CIE., OF LEVALLOIS-PERRET, SEINE, FRANCE.

BRAKE-ACTUATING MECHANISM.

Application filed January 3, 1923. Serial No. 610,493.

*To all whom it may concern:*

Be it known that we, ROBERT EMILE CHARLES DELEVOYE and EMILE ALBERT FRANÇOIS DUMAINE, engineers, citizens of the Republic of France, residing, respectively, at 6 Rue Cavalotti, Paris, Seine, France, and 59 Boulevard de la Saussaye, Neuilly-sur-Seine, Seine, France, have invented new and useful Improvements in Brake-Actuating Mechanisms, of which the following is a specification.

The present invention relates to a brake-actuating device for the front wheels of automobiles and for other uses, said actuating device being constructed in such a manner as to eliminate the influence of the oscillations of the supporting springs on said actuating device itself, and consequently upon the braking action.

The actuating device according to the invention is characterised by the fact that there is interposed, in the transmission mechanism between the operating member and the braking device proper, a compensating mechanism, the displacement of which, caused by the movements of the free end of the spring, neutralise the effects of tension and relaxation produced in the transmission mechanism by the oscillations of the spring.

This actuating device can be realized in practice in various ways. In one of them, the brake pedal acts on each side of the chassis upon a rod fixed to the free end of a lever which is pivoted to the extremity of the shackle and a second rod is connected to the extremity of a crank keyed upon a shaft mounted on the axle and actuating the brake located upon the same side as said crank, the other extremity of this second rod being connected to the said lever at a point intermediate of the length of this latter. In this form of execution, the ratio between the distance between the pivot of the lever and the point thereon upon which the first rod is hinged, and the distance between this latter point and the point where the second rod is hinged, is equal to the ratio between the total length of the spring and the length of the spring comprised between the forward carrier-arm and the point where the spring is fixed to the axle.

The invention is shown diagrammatically and by way of example in the accompanying drawing in which:

Fig. 1 shows an actuating mechanism for the front brakes of automobiles;

Fig. 2 is a section along line 2—2 of Fig. 1;

Fig. 3 shows parts of an actuating mechanism, similar to that of Fig. 1, but slightly modified;

Fig. 4 is a section along line 4—4 of Fig. 3.

First of all the invention will be described with reference to Fig. 1: A shaft E parallel to the axle N and journalled in the chassis of the vehicle is actuated by a pedal A in any suitable manner and, for example, through the intermediary of a lever B keyed upon the same shaft as the pedal A, a lever D keyed upon the shaft E and an adjustable link C connecting the extremities of the levers B and D. The shaft E carries at each extremity a lever F and these two levers F may or may not, as desired, have their movements caused to take place conjointly through the intermediary of a compensating lever. Each lever F actuates, by means of a rod $H^1$, a lever K oscillating about the axis $L^1$ of the spring-shackle L pivoted at $L^2$ to the chassis, as usual. This lever K is connected to the lever O by a rod $H^2$ pivoted to the extremity of the lever O and to the central point $b$ of the length of the lever K. The spring M is mounted in the usual manner in the spring carrier-arm and is fixed to the axle N. Its free end is pivoted at $L^1$ to the spring shackle L. The lever O is keyed upon a rock shaft $O^1$ mounted on the axle N. The shaft $O^1$ actuates the brake situated upon the same side as said shaft by means of a suitable device.

The method of operation of this device is as follows: When the spring M yields, the lever O moves towards the shaft E, but if it is assumed that the axle N is fixed to the central point in the length of the spring M, the horizontal movement of the point $a$ about which the lever K pivots is double that of the axle N and of the lever O, which is forced to take part in the movement of the axle N. The horizontal movements of the points $a$ and $b$ will therefore be in the ratio of two to one, which is the ratio of the lever arms $a$, $c$ and $a$, $b$. The point $c$ therefore remains stationary and the oscillating movement of the axle N and of the parts fixed thereto will have no effect upon the point c nor consequently upon the braking action nor upon the pedal A.

It is obvious that, if the point P were not situated half-way of the length of the spring, the desired effect would be obtained by locating the point b on the lever K in such a manner as to obtain a suitable relation between the lengths a, b and a, c.

The invention has only been shown and described by way of a purely explanatory example, which is in no way limitative, and it is to be understood that it is applicable to other cases than the one selected by way of example. In a general way, it is applicable to the actuation of any organs fixed upon a movable support connected by a leaf spring to a fixed frame which carries the device for actuating said organs.

Furthermore, the details of the actuating mechanism described, could be modified according to practical requirements without departing from the spirit of the invention. For instance, the oscillating link L of the spring M could be replaced by a slide $L^3$ having a rectilinear movement as shown in Figs. 3 and 4 which are self explanatory.

We claim:

1. A brake actuating mechanism comprising in combination with a chassis: a suspension spring for an axle, a movable support for the free end of said spring, a brake pedal mounted on said chassis, a brake-mechanism for wheels mounted on said axle, rods connecting said brake pedal to said brake-mechanism, and means pivotally connected to said movable support, at the point of connection thereof with the free end of the spring, for nullifying the effect of the oscillations of said spring upon said rods.

2. A brake actuating mechanism comprising in combination with a chassis: a suspension spring, a brake-pedal, a movable arm connected to said chassis and to which the free end of said spring is connected, a brake-operating lever, a link pivoted to said arm, a rod having its ends connected to said link and to said brake-operating lever, and a second rod connecting said brake pedal and said link.

3. A brake actuating mechanism comprising in combination with a chassis: a suspension spring, a brake-pedal, a movable arm pivoted to said chassis and to which the free end of said spring is connected, a brake-operating lever, a link pivoted to said arm, a rod having its ends connected to said link and to said brake-operating lever, and a second rod connecting said brake pedal and said link.

4. A brake actuating mechanism comprising in combination with a chassis: a suspension spring for an axle, a brake pedal, a movable arm connected to said chassis and to which the free end of said spring is connected, a brake operating lever, a link pivoted to said arm, a rod having its ends connected to said link and to said brake-operating lever, and a second rod connecting said brake pedal and said link, the ratio between the distance of the point at which the link is pivoted and the point thereof at which the first rod is connected, and the distance between this latter point and the point where the second rod is connected being equal to the ratio between the total length of said spring and the length thereof comprised between its point of direct connection to the chassis and the point where said spring is fixed to the axle.

ROBERT EMILE CHARLES DELEVOYE.
EMILE ALBERT FRANÇOIS DUMAINE.